US009322148B2

(12) United States Patent
Stratton et al.

(10) Patent No.: US 9,322,148 B2
(45) Date of Patent: Apr. 26, 2016

(54) SYSTEM AND METHOD FOR TERRAIN MAPPING

(71) Applicants: Caterpillar Inc., Peoria, IL (US); Carnegie-Mellon University, Pittsburgh, PA (US)

(72) Inventors: Kenneth L. Stratton, Dunlap, IL (US); Louis Bojarski, Coraopolis, PA (US); Peter Rander, Mars, PA (US); Randon Warner, Allison Park, PA (US); Jason Ziglar, Christianburg, VA (US)

(73) Assignees: Caterpillar Inc., Peoria, IL (US); Carnegie-Mellon University, Pittsburgh, PA (US)

( * ) Notice: Subject to any disclaimer, the term of this patent is extended or adjusted under 35 U.S.C. 154(b) by 127 days.

(21) Appl. No.: 14/305,469

(22) Filed: Jun. 16, 2014

(65) Prior Publication Data

US 2015/0361642 A1 Dec. 17, 2015

(51) Int. Cl.
| | | |
|---|---|---|
| *E02F 9/26* | (2006.01) | |
| *G05D 1/00* | (2006.01) | |
| *G05B 15/02* | (2006.01) | |
| *G06F 17/30* | (2006.01) | |

(52) U.S. Cl.
CPC .............. *E02F 9/261* (2013.01); *G05B 15/02* (2013.01); *G05D 1/00* (2013.01); *G06F 17/30241* (2013.01); *G06F 17/30345* (2013.01); *G05D 2201/0202* (2013.01)

(58) Field of Classification Search
CPC ........ G01C 21/32; G01C 21/26; G01C 21/20; G06F 17/30241; G06T 17/05
USPC .......................................................... 701/461
See application file for complete search history.

(56) References Cited

U.S. PATENT DOCUMENTS

| | | | |
|---|---|---|---|
| 4,818,107 A | 4/1989 | Ono et al. | |
| 5,880,681 A | 3/1999 | Codina et al. | |
| 5,951,613 A | 9/1999 | Sahm et al. | |
| 6,865,464 B2 | 3/2005 | Colburn | |
| 6,934,616 B2 | 8/2005 | Colburn et al. | |
| 7,969,558 B2 | 6/2011 | Hall | |
| 8,139,108 B2 | 3/2012 | Stratton et al. | |
| 8,351,684 B2 | 1/2013 | Clar et al. | |
| 2011/0213529 A1 | 9/2011 | Krause et al. | |
| 2011/0254833 A1 | 10/2011 | McDaniel et al. | |
| 2012/0136525 A1 | 5/2012 | Everett et al. | |
| 2013/0054133 A1 | 2/2013 | Lewis et al. | |

FOREIGN PATENT DOCUMENTS

WO    WO 2010/067091    6/2010

*Primary Examiner* — Maceeh Anwari
(74) *Attorney, Agent, or Firm* — Leydig, Voit & Mayer, Ltd.

(57) ABSTRACT

A mapping system includes a pose sensor, a mapping sensor, a database defining a work surface, and a controller. The controller is configured to receive pose signals and determine the position and the orientation of the machine and receive mapping signals and determine a plurality of raw data points. The controller further determines a plurality of machine points defining a position of a portion of the machine and filters the plurality of raw data points based upon the plurality of machine points to define a plurality of filtered data points. The database may be updated with the plurality of filtered data points.

20 Claims, 5 Drawing Sheets

SYSTEM AND METHOD FOR TERRAIN MAPPING

TECHNICAL FIELD

This disclosure relates generally to mapping a work site, and more particularly, to a system and method for mapping a work site with a sensor positioned on a movable machine.

BACKGROUND

Movable machines such as dozers, motor graders, excavators, wheel loaders, and other types of equipment are used to perform a variety of tasks. For example, these machines may be used to move material and/or alter work surfaces at a work site. The machines may perform operations such as digging, loosening, carrying, etc., different materials at the work site.

During the performance of these tasks, the machines may operate in situations that are hazardous to an operator, under extreme environmental conditions uncomfortable for the operator, or at work locations remote from civilization. Because of these factors, the completion of some tasks by an onboard operator may be dangerous, expensive, labor intensive, time consuming, and inefficient.

In some instances, machines at these locations are operated by remote control. More specifically, an offboard operator located remotely from the machine may control operation of the machine from a more suitable location. To do so, one or more displays or visual images of the machine and the work environment are typically provided at a remote control console or station operated by the offboard operator. In one example, a visual representation of the machine and work environment is provided through live video that is broadcast from the work site to the operator.

In another example, electronic maps may be generated to depict the work environment at which the machines is operating. The electronic maps may be displayed together with or instead of the live video. In addition to permitting the operator to view the work site, the electronic map may also be used to aid or control a material moving process, determine progress towards completion of tasks, calculate material ingress and egress, and identify work site inefficiencies or trends.

Accurate mapping of the work site may include certain difficulties. In one example, the work site may be mapped by sensors positioned on the machines that update the electronic map as the machines operate at the work site. When using mapping systems that operate onboard a movable machine, portions of the machine may fall within the field of view of the sensor. In such case, some of the sensor data may not reflect that actual work surface at the work site but rather may be portions of the machine that were positioned within the field of view of the sensor.

In another example, the work site may be mapped by sensors positioned offboard of the machines operating at the work site. U.S. Pat. No. 8,351,684 discloses a system using sensors positioned about a work site to map the work site. A controller may use the data generated by the sensors to determine the location of the work surface and objects at the work site.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system mounted on a machine for mapping a work surface may include a pose sensor associated with machine for generating pose signals indicative of a position and an orientation of the machine and a mapping sensor on the machine for generating a plurality of raw data points defining a mapped surface. The system also has a database including a plurality of points defining the work surface and a controller. The controller may be configured to receive pose signals from the pose sensor and determine the position and the orientation of the machine based upon the pose signals. The controller may further receive mapping signals from the mapping sensor, determine the plurality of raw data points based upon the mapping signals, and determine a plurality of machine points defining a position of a portion of the machine based upon the pose signals. The controller may also filter the plurality of raw data points based upon the plurality of machine points to define a plurality of filtered data points and update the database based upon the plurality of filtered data points.

In another aspect, a controller-implemented method of mapping a work surface may include receiving pose signals from a pose sensor associated with a machine indicative of a position and an orientation of the machine, determining the position and the orientation of the machine based upon the pose signals, receiving mapping signals from a mapping sensor on the machine for generating a plurality of raw data points defining a mapped surface, and determining the plurality of raw data points based upon the mapping signals. The method may further include determining a plurality of machine points defining a position of a portion of the machine based upon the pose signals, filtering the plurality of raw data points based upon the plurality of machine points to define a plurality of filtered data points, and updating a database including a plurality of points defining the work surface based upon the plurality of filtered data points.

In still another aspect, a machine may include a frame, a prime mover associated with the frame, a pose sensor for generating pose signals indicative of a position and an orientation of the machine, and a mapping sensor for generating a plurality of raw data points defining a mapped surface. The machine may further include a database including a plurality of points defining a work surface and a controller. The controller may be configured to receive pose signals from the pose sensor 25 and determine the position and the orientation of the machine 10 based upon the pose signals. The controller may further receive mapping signals from the mapping sensor 31, determine the plurality of raw data points based upon the mapping signals, and determine a plurality of machine points defining a position of a portion of the machine based upon the pose signals. The controller 41 may also filter the plurality of raw data points based upon the plurality of machine points to define a plurality of filtered data points and update the database based upon the plurality of filtered data points.

DETAILED DESCRIPTION

Figure 1:
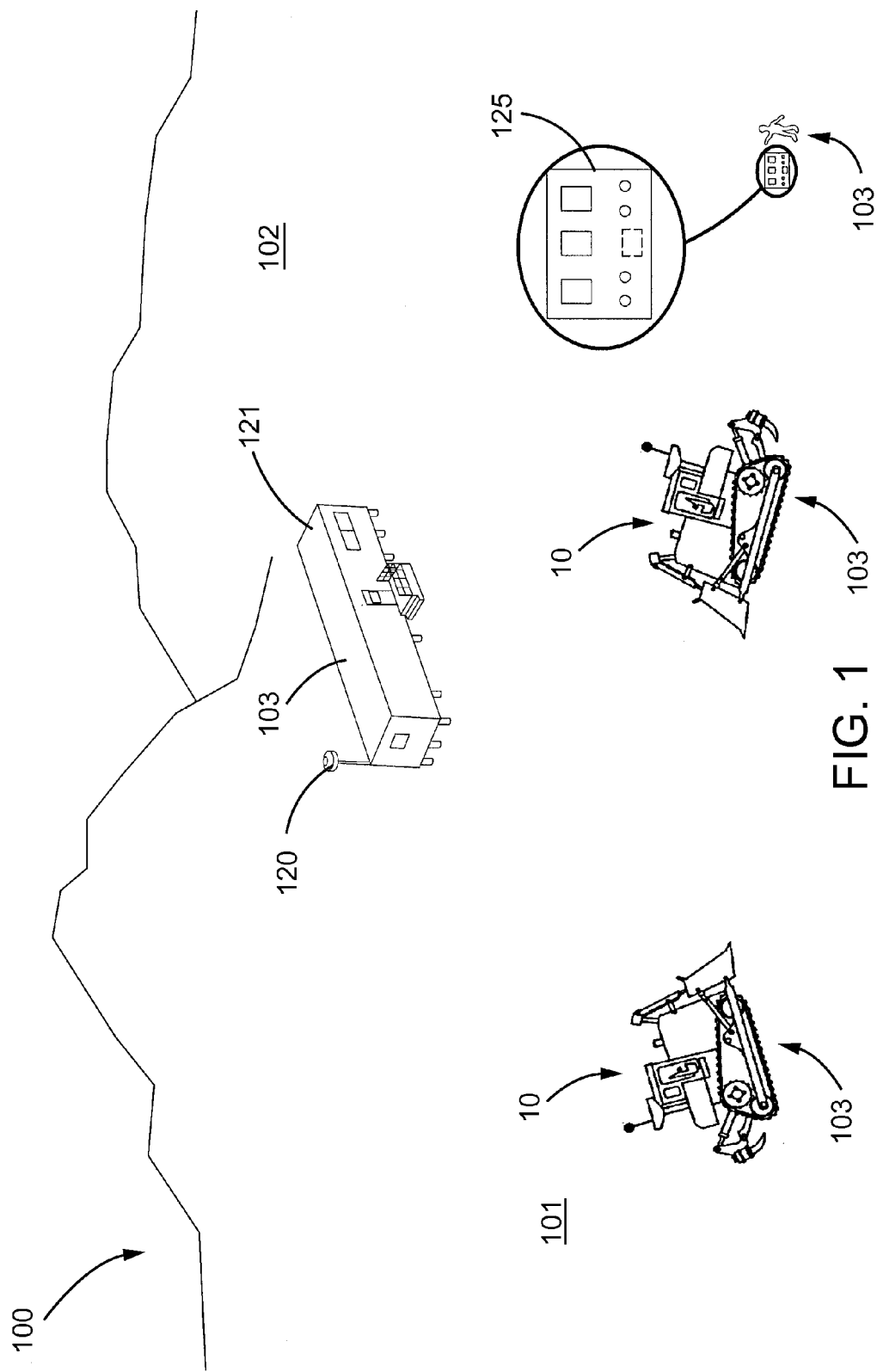
FIG. 1 is a view of an exemplary work site at which a machine incorporating the principles disclosed herein may be used.

FIG. 1 illustrates an exemplary work site 100. Work site 100 may be, for example, a mine site, a landfill, a quarry, a construction site, or another type of site on which work or labor is performed. In one embodiment, work site 100 may undergo topographic alteration due to work performed thereon by one or more machines 10. Machines 10 may perform, for example, mining, material-gathering, excavation, or other topography-altering tasks on work site 100. Machines 10 may be, for example, excavators, loaders, dozers, motor graders, haul trucks, and/or other types of equipment for performing topography-altering tasks to work site 100.

The work surface 101 of work site 100 may be characterized by a variety of features. The features may include, for example, the actual terrain 102 such as soil, rock, ore, mineral deposits, coal, precious metal, lumber, scrap, garbage, and other similar materials. In addition, objects 103 may form a portion of work surface 101. Objects 103 may include infrastructure, material transport machines and mechanisms, storage, and processing facilities, buildings, and other structures and fixtures found at a work site. Objects 103 may also include machines, personnel, and other items that may move about work site 100.

The machines 10 operating at the work site 100 may be self-directed machines configured to autonomously operate at the work site, manually operated machines configured to be operated under the control of an operator, or semi-autonomous machines configured to perform some operations autonomously and other functions under the control of an operator. As used herein, a machine operating in an autonomous manner operates automatically based upon information received from various sensors without the need for human operator input. As an example, a haul or load truck that automatically follows a path from one location to another and dumps a load at an end point may be operating autonomously. A machine operating semi-autonomously includes an operator, either within the machine or remotely, who performs some tasks or provides some input and other tasks are performed automatically and may be based upon information received from various sensors. As an example, a haul truck that automatically follows a path from one location to another but relies upon an operator command to dump a load may be operating semi-autonomously. In another example of a semi-autonomous operation, an operator may dump a bucket from an excavator into a haul truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
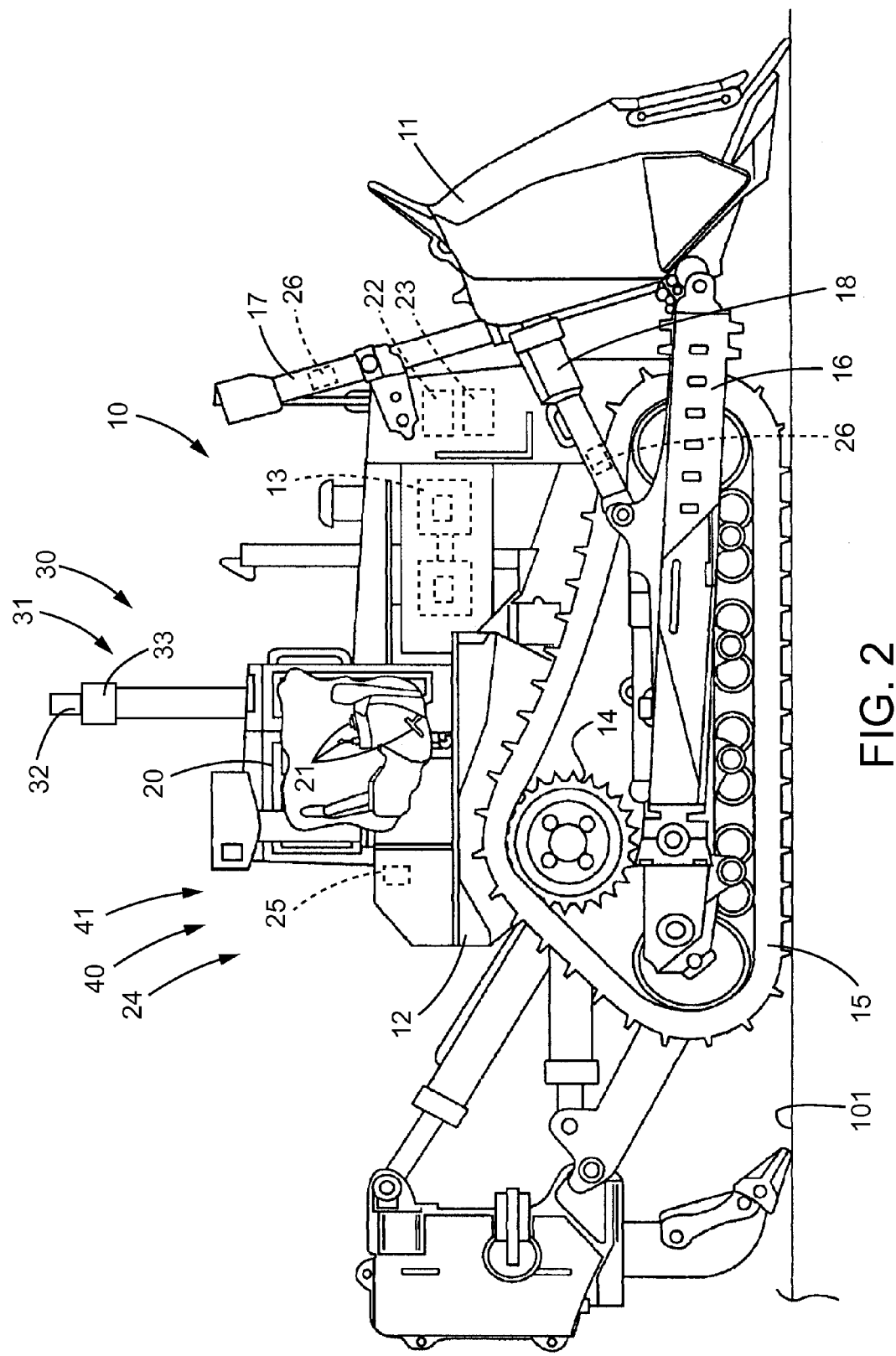
FIG. 2 is a diagrammatic illustration of a machine in accordance with the disclosure.

FIG. 2 shows a diagrammatic illustration of a machine 10 such as dozer with a work implement or blade 11 configured to engage or push material at the work site 100. The machine 10 includes a frame 12 and a prime mover such as an engine 13. A ground-engaging drive mechanism such as a track 15 may be driven by a drive wheel 14 on each side of machine 10 to propel the machine. Although machine 10 is shown in a "track-type" configuration, other configurations, such as a wheeled configuration, may be used.

Machine 10 may be configured with a type of mechanical drive system so that engine 13 drives a torque converter (not shown) which in turn drives a transmission (not shown). The transmission may be operatively connected to the drive wheels 14 and the tracks 15. Operation of the engine 13 and transmission, and thus the drive wheels 14 and tracks 15, may be controlled by a control system 40 including an on-board controller such as controller 41. The systems and methods of the disclosure may be used with any machine propulsion and drivetrain mechanisms applicable in the art including hydrostatic, electric, or a mechanical drive.

Ground engaging work implement such as blade 11 may be pivotally connected to frame 12 by arms 16 on each side of machine 10. First hydraulic cylinder 17 coupled to frame 12 supports blade 11 in the vertical direction, and allows blade 11 to move up and down vertically from the point of view of FIG. 2. A second hydraulic cylinder 18 on each side of the machine 10 allows the pitch angle of the blade tip to change relative to a centerline of the machine. In other configurations, additional actuators or other mechanisms may be provided to permit additional movement of blade 11.

Machine 10 may include a cab 20 that an operator may physically occupy and provide input to control the machine. Cab 20 may include one or more input devices 21 through which the operator may issue commands to control the propulsion and steering of the machine as well as operate various implements associated with the machine.

Machine 10 may be equipped or associated with a plurality of sensors that provide data indicative (directly or indirectly) of various operating parameters of the machine. The term "sensor" is meant to be used in its broadest sense to include one or more sensors and related components that may be associated with the machine 10 and that may cooperate to sense various functions, operations, and operating characteristics of the machine.

One or more movement sensors may be positioned on the machine 10 for sensing movement of the machine 10 and generating movement signals indicative of movement of the machine. For example, a pitch rate sensor 22 (e.g., a gyroscope) may be provided or mounted on the machine 10, on the blade 11, or on an implement frame member to which the blade is mounted. The pitch rate sensor 22 may be used to provide a pitch rate signal indicative of a measured pitch rate of the machine 10 or the blade 11, depending upon the location of the sensor. The pitch rate sensor 22 may be a "stand-alone" sensor or part of a multi-function sensor such as an inertial measurement unit that also measures the acceleration of the machine 10 along various axes. The pitch rate measured by the pitch rate sensor 22 is indicative of the rate of change of the pitch angle of the sensor.

An acceleration sensor 23 (e.g., a 3-axis accelerometer) may also be provided as a separate component or part of a multi-function sensor. The acceleration sensor 23 may be used to provide an acceleration signal indicative of acceleration of the machine 10 relative to a gravity reference. If the acceleration sensor 23 is not part of a multi-function sensor, it may be positioned adjacent the pitch rate sensor 22 or at another location on machine 10.

A pose sensing system 24, as shown generally by an arrow in FIG. 2 indicating association with the machine 10, may include a pose sensor 25 to sense the position and orientation (i.e., the heading, pitch, roll or tilt, and yaw) of the machine relative to the work site 100. The position and orientation of the machine 10 are sometimes collectively referred to as the pose of the machine. The pose sensor 25 may include a plurality of individual sensors that cooperate to generate and provide pose signals to controller 41 indicative of the position and orientation of the machine 10. In one example, the pose sensor 25 may include one or more sensors that interact with a positioning system such as a global navigation satellite system or a global positioning system to operate as a pose sensor. In another example, the pose sensor 25 may further include a slope or inclination sensor such as pitch angle sensor for measuring the slope or inclination of the machine 10 relative to a ground or earth reference. The controller 41 may use pose signals from the pose sensors 25 to determine the pose of the machine 10 within work site 100. In other examples, the pose sensor 25 may include an odometer or another wheel rotation sensing sensor, a perception based system, or may use other systems such as lasers, sonar, or radar to determine all or some aspects of the pose of machine 10.

If desired, the pose sensing system 24 may include distinct position and orientation sensing systems. In other words, a position sensing system (not shown) may be provided for determining the position of the machine 10 and a separate orientation sensing system (not shown) may be provided for determining the orientation of the machine.

One or more implement position sensors indicated generally at 26 may be provided to generate and provide implement position signals for determining the position of a work implement such as blade 11 relative to the machine 10. In one embodiment, the implement position sensors 26 may be rotary potentiometers associated with the pivot joints between the machine 10, the arms 16 and the blade 11. The position of the work implement may be determined based upon the dimensions of the linkage components supporting the work implement and the angles between the various components. In another example, sensors may be associated with the hydraulic cylinders to determine the displacement of each cylinder. The displacement of the cylinders together with the dimensions of the linkage components supporting the work implement, the position of the work implement may be determined.

While the examples above of implement position sensors 26 may be used to determine the position of implement position sensors 26 relative to the machine 10, other implement position sensors may use another frame of reference such as a global navigation satellite system or a global positioning system. Such implement position sensors 26 may include additional position sensors similar to the position sensors described above with respect to the pose sensing system 24 mounted on the work implement to track or identify the position of the work implement. In the example based upon the dozer depicted in FIG. 2, such additional position sensors may be mounted on blade 11 and may be used to determine the position of the blade. Other types of sensors are also contemplated.

A terrain mapping system 30 may be positioned or associated with machine 10 to scan work site 100 and map the work surface 101. The terrain mapping system 30 may include one or more mapping sensors 31 that may scan work site 100 to gather information defining the work surface 101 thereof. More specifically, mapping sensors 31 may determine the distance and direction from the mapping sensors 31 to points that define a mapped surface such as work surface 101 of work site 100. Mapping sensors 31 may, in addition or alternatively, gather other information about points on work surface 101, such as, for example, the color of work surface 101 at each location, if desired. While some mapping sensors 31 may be mounted on machine 10, other mapping sensors may be mounted on other machines or mounted in fixed locations at the work site 100.

Mapping sensors 31 may embody LIDAR (light detection and ranging) devices (e.g., a laser scanner) 32, RADAR (radio detection and ranging) devices, SONAR (sound navigation and ranging) devices, camera devices, and/or other types of devices that may determine the range and direction to objects and/or attributes thereof. Mapping sensors 31 may be used to sense the range, the direction, the color, and/or other information or attributes about the various points along the work surface 101 and generate mapping signals indicative of such sensed information and attributes.

In an example using a LIDAR device 32, the mapping sensors 31 may sense or determine the range from the LIDAR device for each position along the work surface 101. Such range may be used to determine the coordinates of each point sensed by the mapping sensors 31. In one embodiment, a LIDAR device 32 may include one or more lasers that rotate about machine 10 to map the work surface 101 surrounding the machine. In an example using a camera device 33, the mapping sensors 31 may sense images including colors of the work surface 101. In one embodiment, the camera device 33 may include two or more cameras and the images from the cameras "stitched" together to generate an image of the work surface 101. Other configurations of the mapping sensors 31 are contemplated.

Mapping sensors 31 may include and/or be associated with a timing device (not shown) to establish or compute a time designation for each mapped signal. The time designation may be associated with or appended to each mapped signal to maintain a record as to when each location was mapped or the signal generated. The time designation may be measured relative to any desired system such as Greenwich Mean Time, or another type of time measurement system.

The data for each point of the work surface 101 of work site 100 may have a have a unique identifier such as a set of coordinates sufficient to define a location of the particular point on the surface with respect to a coordinate system (e.g., Cartesian, polar, or spherical coordinate data). In addition, the data may further include the time at which the data was collected. For example, data for each point may be stored in the form of x, y, z, and t where x, y, and z correspond to Cartesian coordinates and t is the time of the data collection. Each of the points on work surface 101 may also include one or more additional attributes such as the color of the particular location on the surface, if desired.

Machine 10 may be controlled by a control system 40 as shown generally by an arrow in FIG. 2 indicating association with the machine. The control system 40 may include an onboard electronic control module or controller such as controller 41. The controller 41 may receive input command signals from a wireless network system 120 (FIG. 1), remote control input command signals from an operator using a remote control unit or remote control console 125 to operate machine 10 remotely, or operator input command signals from an operator operating the machine 10 from within cab 20. The controller 41 may control the operation of various aspects of the machine 10 including the drivetrain as well as the hydraulic systems and other systems that operate the work implements. The control system 40 may utilize various input devices to control the machine 10 and one or more sensors to provide data and input signals representative of various operating parameters of the machine 10 and the environment of the work site 100.

The controller 41 may be an electronic controller that operates in a logical fashion to perform operations, execute control algorithms, store and retrieve data and other desired operations. The controller 41 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 41 such as power supply circuitry, signal conditioning circuitry, driver circuitry, and other types of circuitry.

The controller 41 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 41 may be implemented in hardware and/or software without regard to the functionality. The controller 41 may rely on one or more data maps relating to the operating conditions and the operating environment of the machine 10 and the work site 100 that may be stored in the memory of controller. Each of these data maps may include a collection of data in the form of tables, graphs, and/or equations.

The control system 40 and controller 41 may be located on the machine 10 or may be distributed with components also located remotely from the machine 10 such as at a command center 121 (FIG. 1) or at the remote control console 125. The functionality of control system 40 may be distributed so that certain functions are performed at the machine 10 and other functions are performed remotely.

The sensed data generated by the mapping sensors 31 for each point on work surface 101 may be used by the terrain mapping system 30 to generate a terrain map of the work site 100. In an embodiment, the terrain map may be stored within controller 41 and/or an offboard controller as a matrix in a database. Other forms of data storage are contemplated. In an embodiment, the terrain map may be displayed as a three-dimensional height map based upon the height of the points of the work surface 101. In instances in which more than one type of data (e.g., location and color) has been gathered for each point on work surface 101, the terrain mapping system 30 may overlay or combine the data on the terrain map. For example, if the terrain mapping system 30 includes both a LIDAR device 32 and a camera device 33, the terrain mapping system may develop a terrain map that displays the height of work surface 101 as well as the color of the different areas of the terrain map.

The data or data points defining the work surface 101 may be generated by one or more machines 10 having a terrain mapping system 30 and/or another system having a terrain mapping system such as satellites, aircraft, and other machines or systems. After the terrain map is initially generated, data collected by the terrain mapping system 30 of the machine 10 may be subsequently used to update the terrain map directly within controller 41 and/or transmitted such as by wireless network system 120 to an offboard controller to update the terrain map. Data pertaining to the work surface 101 may also be generated by other machines having terrain mapping systems operating at the work site 100 and the terrain map updated by transmitting data from the other machines to the offboard controller. In still another embodiment, the machine 10 and other machines may operate at the work site 100 with a peer-to-peer data transfer system in which the machines transfer data for the terrain map directly between machines.

Figure 3:
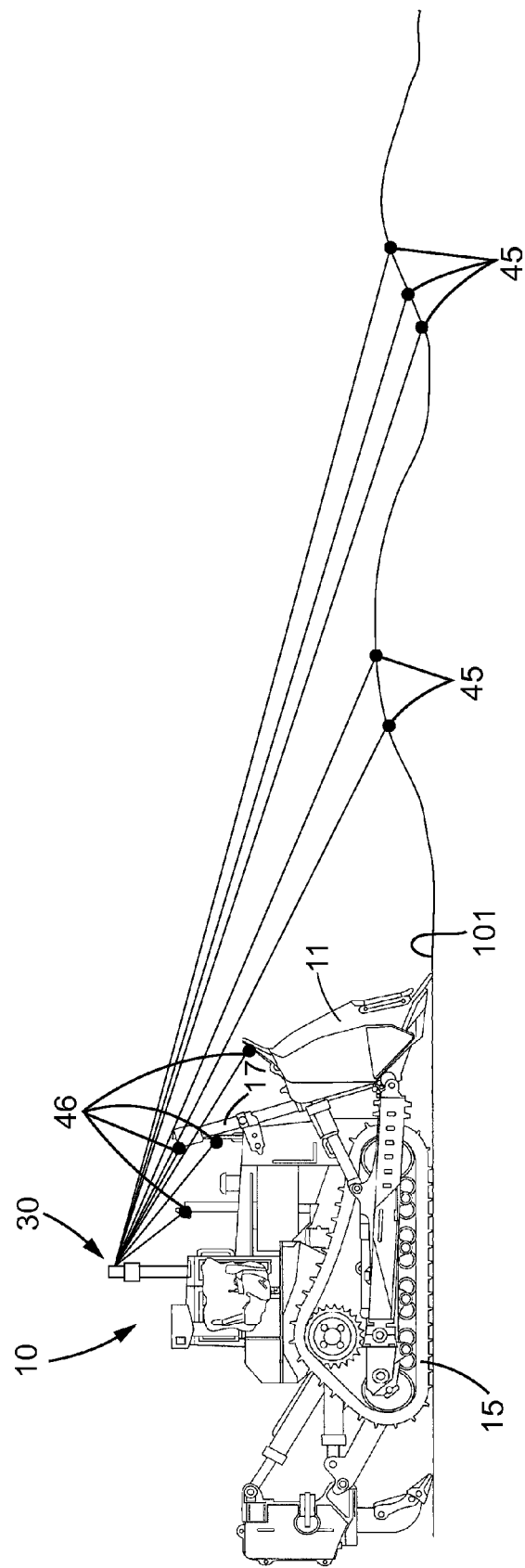
FIG. 3 is a diagrammatic illustration of a machine performing a terrain mapping process.

Referring to FIG. 3, a machine 10 in the process of mapping or scanning the work surface 101 is depicted. During the process of mapping work surface 101, mapping sensors 31 may detect and gather data for all of elements or features within the sensors' range or field of view, including the terrain 102, objects 103, and/or any other items found thereon. In other words, the mapping sensors 31 may not differentiate between different features or objects within their field of view. The phrase "field of view" is meant to be used in its broadest sense to include the area scanned by any type of sensor and not just the range of a sensor that operates with visible light. Due to the indiscriminate nature of the mapping sensors 31, any portions of the machine 10 that enter the field of view of the mapping sensors will also be mapped. In FIG. 3, the mapping sensor may is depicted schematically with and engaging data points on the work surface 101 at 45 and engaging machine points on the machine 10 at 46. In other words, the beams from the lasers of LIDAR device 32 engage the work surface 101 at 45 but are interrupted by the machine 10 at 46 before reaching the work surface.

Figure 4:
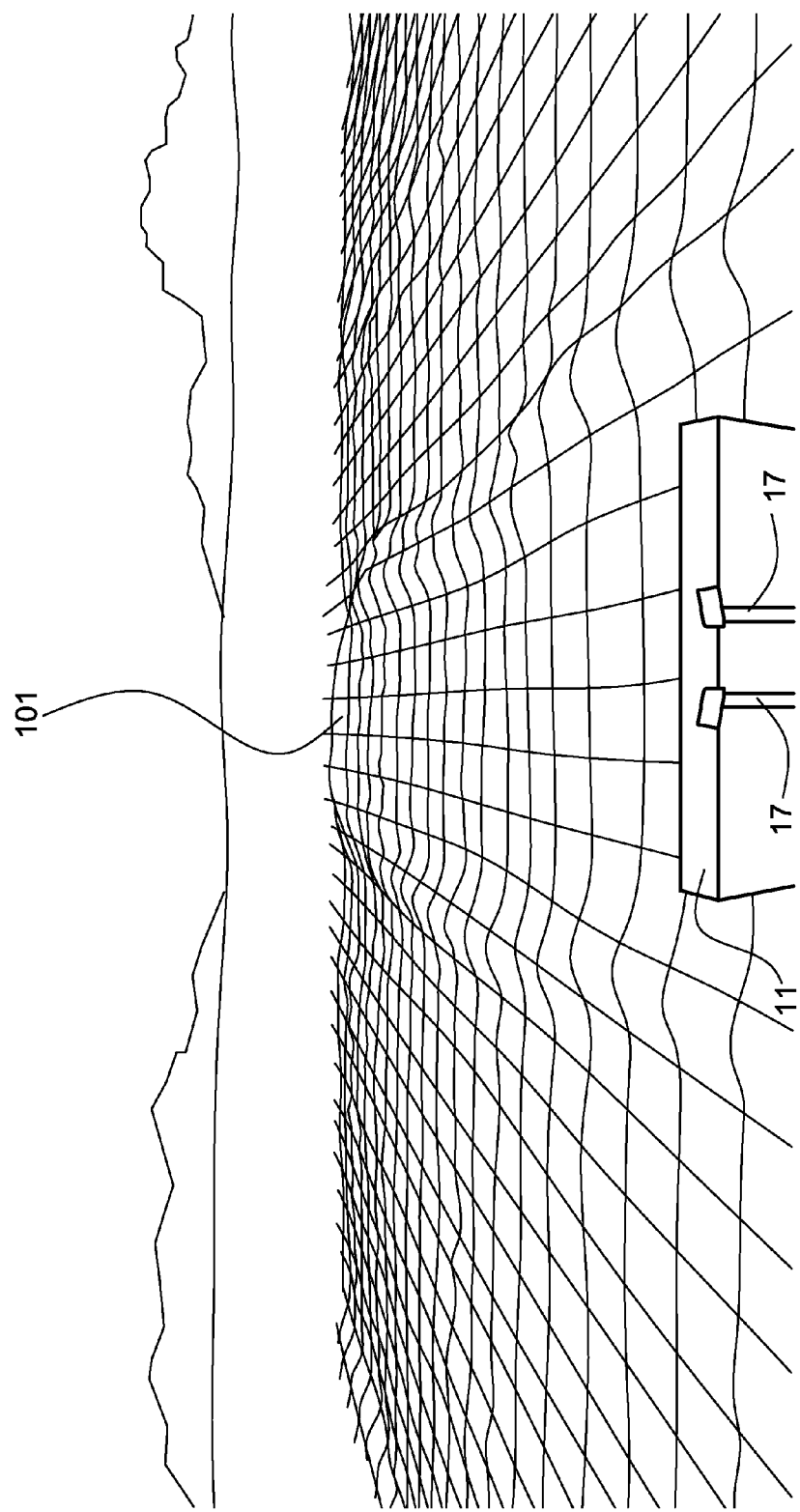
FIG. 4 schematic view of a portion of a field of view of a mapping sensor.

FIG. 4 depicts somewhat schematically an example of a portion of the field of view of the mapping sensor 31 such as LIDAR device 32. In the drawing, it may be seen that the majority of the field of view is of the work surface 101 but upper portions of the blade 11 and first hydraulic cylinder 17 extend into the lower portion of the field of view.

In some instances, it may be possible to position the mapping sensors 31 to minimize the amount or extent of the machine 10 that falls within the field of view of the mapping sensors. However, particularly in instances in which portions or components of the machine 10 are movable, it may not be possible to position the mapping sensors 31 so as to avoid portions of the machine. For example, as depicted in FIGS. 3-4, when operating machine 10, the blade 11 and other components such as first hydraulic cylinder 17 may fall within the field of view of the mapping sensors 31. As a result, while operating the machine 10 such as during a dozing operation and simultaneously mapping the work surface 101, all or portions of the blade 11 may obscure a portion of the field of view of the mapping sensors 31. In other words, portions of the blade 11 and other components may be positioned between the work surface 101 and the mapping sensors 31. The data generated by the mapping sensors 31 will thus include data points that correspond to the work implement and any other portion of the machine 10 falling within the field of view of the mapping sensors 31 rather than the work surface 101. Any data points corresponding to the work implement and any other portion of the machine will thus not accurately reflect the position of work surface 101. If such data points corresponding to the work implement and other portions of the machine were used to update the terrain map of work surface 101, the terrain map would be inaccurate.

Figure 5:
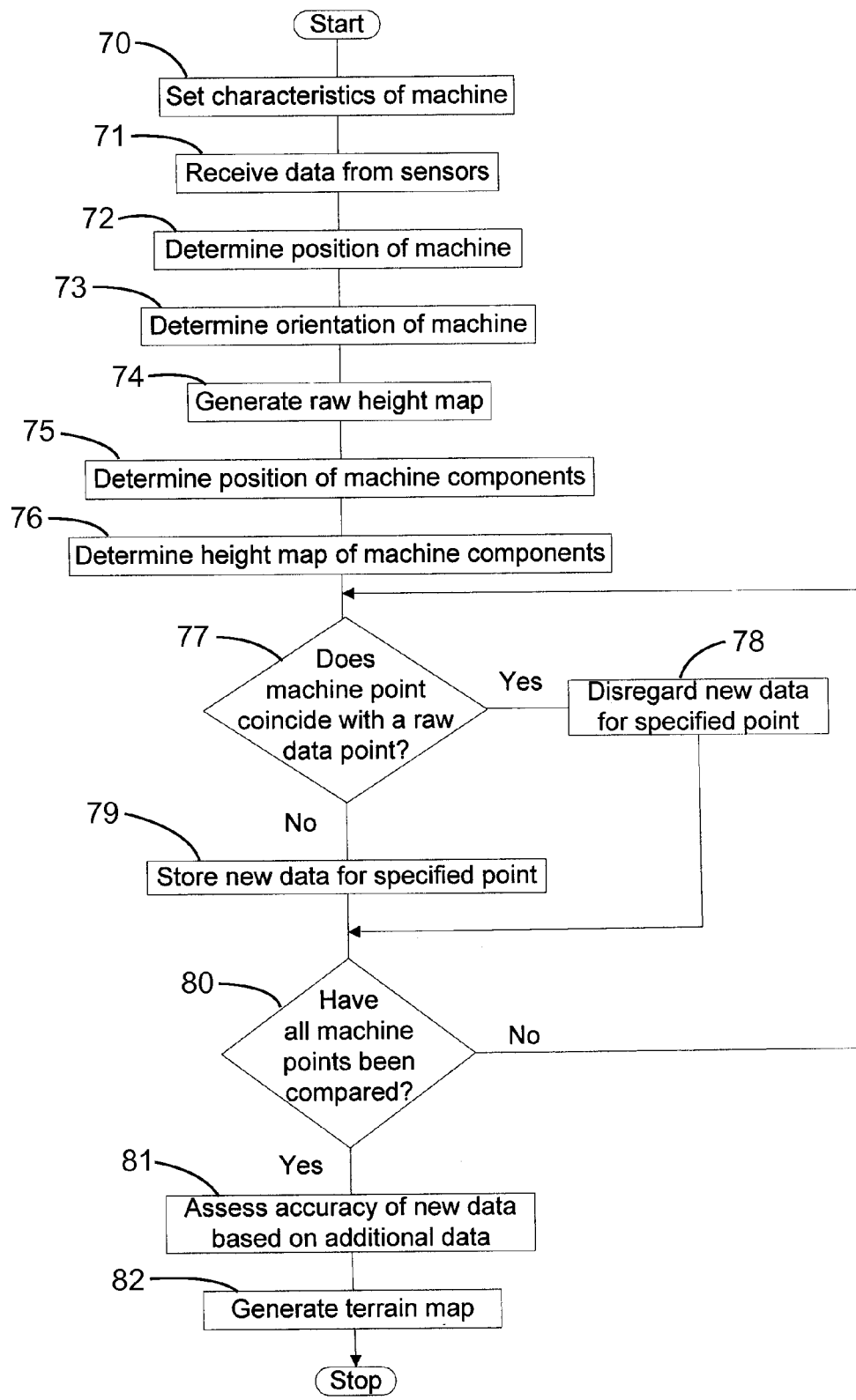
FIG. 5 is a flowchart of a terrain mapping process.

A process for operating the terrain mapping system 30 is depicted in the flowchart in FIG. 5. Initially, the characteristics of the machine 10 may be entered or set at stage 70. The characteristics may include the position of the mapping sensors 31 on machine 10, the shape and configuration of any movable work implement and linkage associated therewith such as blade 11 and arms 16, and the type of machine and its configuration. In addition, colors corresponding to portions of the machine 10 may be entered or stored within the controller 41. The details entered or set may be sufficiently detailed to permit controller 41 to determine the position of any portions of the machine 10 that may fall within the field of view of the mapping sensors 31. In one example, the details may be sufficient to permit controller 41 to determine the position of the work implement and linkage and the position of each point along any surface thereof facing the mapping sensors 31. In instances in which the implement position sensors 26 operate with a global positioning system, the configuration of the linkage associated with the work implement may not be necessary.

The characteristics of the machine including the work implement and linkage, the position of the mapping sensors 31, and any expected colors may be set or entered in any manner including by entering the known dimensions of the machine, work implement, linkage, and the position of the mapping sensors 31, by entering a model of the machine 10 and/or model numbers associated with the work implement and linkage, or by entering a code associated with the configuration of the machine, the work implement, linkage, and the mapping sensors. Each of the values may be entered either electronically (such as with a barcode, an RFID, or the like) or manually by an operator, management personnel, or other personnel either at machine 10 or at a location remote from the machine. In another embodiment, any or all of the characteristics may be set as defaults within controller 41.

At stage 71, the controller 41 may receive data from various sensors associated with the machine. In particular, the controller 41 may receive data from pose sensor 25, implement position sensors 26, and mapping sensors 31. The controller 41 may operate pose sensing system 24 to determine the position of the machine 10 at stage 72 and the orientation of the machine at stage 73 based upon the position data and the orientation data from the pose sensor 25.

At stage 74, the controller 41 may operate terrain mapping system 30 to generate a raw height map based upon the data received from the mapping sensors 31. More specifically, the controller 41 may receive all of the data (e.g., x, y, z coordinates, time of generation, and color) for all of the points within the field of view of the mapping sensors 31 regardless of whether the data corresponds to terrain 102, objects 103, or components of the machine 10 such as blade 11. Inasmuch as the data has not been confirmed as being a part of the work surface 101, such data may be referred to herein as raw data. Accordingly, the data points may be referred to as raw data points and the height data may be referred to as raw height data. In some instances, the raw height data may be used by the controller 41 to generate or define an electronic map or database that compiles or stores all of the coordinates (x, y, and z) and other attributes (e.g., time of generation and color) of the raw data returned or sensed by the mapping sensors 31. Such electronic map may be referred to as a raw height map. In other words, raw height map includes all of the data within the field of view of the mapping sensors 31 regardless of whether the data corresponds to terrain 102, objects 103, or components of the machine 10 such as blade 11.

The controller 41 may determine at stage 75 the position of any static and movable components of machine 10. For example, based upon the information set within the controller 41 at stage 70 regarding the position of the mapping sensors 31 and the configuration of the machine 10, the controller may determine the position of any fixed portions or components of the machine relative to the mapping sensors 31 or another reference position or point. In addition, the controller 41 may use data from the implement position sensors 26 and the information set within the controller 41 at stage 70 to determine the position of any movable components of machine 10 relative to the mapping sensors 31 or another reference position or point. The position of the fixed and movable portions of the machine 10 may be used by controller 41 to determine a plurality of points on the machine (i.e., machine points) that define the position of each portion of machine. Such machine points may be defined relative to their location about machine 10 and, based upon the pose of the machine as determined by the pose sensing system 24, the machine points may be defined or determined in an absolute sense relative to the work site 100.

At stage 76, the controller 41 may use the machine points to generate and store an electronic map or database of all of the static and movable portions of the machine 10. Such electronic map may be in the form of a height map that includes the coordinates (x, y, and z) of the static and movable portions of the machine 10. The electronic map of the fixed portions of the machine 10 may be set as part of stage 70 if desired. In one embodiment, the electronic map of the portions of the machine 10 may be set relative to the machine pose. In another embodiment, the electronic map of the portions of the machine may be set relative to the position of the mapping sensors 31.

At decision stage 77, the controller 41 may filter the raw data points to determine whether any portions of the static and movable components of machine 10 are within the field of view of the mapping sensors 31. In doing so, the controller 41 may compare the coordinates (x, y, and z) for each machine point of the static and movable components of the machine 10 with the coordinates (x, y, and z) of each raw data point of the raw height map generated at stage 74. If the coordinates of a point on the machine 10 correspond or match the coordinates of any portion of the raw height map, the data received by the mapping sensors 31 for that coordinate reflect the position of a portion of the machine 10 and not the terrain 102 or objects 103 on the terrain. Accordingly, if the coordinates of any machine point match the coordinates any raw data point, the controller 41 may disregard at stage 78 the raw data for that specified point. Through such a process, the raw data points will be filtered based upon the machine points to define a plurality of filtered data points that exclude those points that are actually mapped portions of machine 10. Such filtered data points may be added to the existing database to update the database and define a new map of the work surface 101.

If the coordinates of any machine point do not match the coordinates of any raw data point, the controller 41 may store and use at stage 79 the raw data for that point on the machine. In doing so, the controller 41 may further save as part of the data a time designation as to when the coordinates were generated or stored. The timing designation may be used for various purposes. In one example, the timing of the data may be used to generate a probability as to its accuracy. For example, the timing of changes in terrain may be compared to the timing of machines that are adjacent to specified point. If a machine was not adjacent to an area in which the terrain changed, the probability that such change in terrain is correct may be reduced.

Regardless of whether the coordinates of the machine point on the machine 10 match the coordinates of a raw data point on the raw height map, the controller 41 may determine at decision stage 80 whether all of the machine points have been compared to the raw height map. If all of the points on the machine 10 have not been compared, the process beginning at decision stage 77 may be repeated until all of the points on the machine 10 have been compared. It should be noted that it may not be necessary to compare the coordinates of the static portions of the machine 10 more than once unless some aspect of machine 10 or mapping sensors 31 changes after the initial analysis. In other words, since the relationship between the static portions of the machine 10 and the mapping sensors 31 are unlikely to change during the operation of the machine 10, it may be possible to make a single determination as to whether any static portions of the machine fall within the field of view of the mapping sensors 31.

Once the coordinates of all of the machine points have been compared to the coordinates of the raw height map, the accuracy of the filtered data points stored at stage 79 may be assessed at stage 81 to determine the probability or likelihood of the accuracy of the data. More specifically, the filtered data points may be compared to data from other sources to assess a confidence level in the accuracy of the filtered data. Once the accuracy of the filtered data has been assessed, a decision may be made within controller 41 as to whether to use the filtered data.

As an example, the ground engaging drive mechanism (such as tracks 15) of machine 10 engages the work surface 101 of work site 100 and the points of contact with the work surface may be used to generally define a plane. The position and orientation of such plane is sometimes referred to as the track pose. Based upon the dimensions and the pose of the machine 10 for a given location, the track pose may be determined. The raw height map generated by the terrain mapping system 30 within controller 41 may be compared to the track pose as the machine 10 moves about the work site 100 to assess the accuracy of the portions of the filtered data points corresponding to the track pose.

In another example, an estimate of the angle of repose of the material on which the machine 10 is operating may be entered or set within controller 41. The controller 41 may use the angle of repose to assess the accuracy of the filtered data. For example, if blade 11 of machine 10 is used to create a slot in the surface of the work site 100, the position of the bottom of the slot, the position of the surface adjacent the slot, and the angle of repose may be used to determine an expected position for the material at the edges of the slot. The expected position may be compared to the filtered data to assess its accuracy.

In still another example, the colors sensed by mapping sensors 31 may be used to assess the accuracy of the filtered data. As stated above, in some instances, colors may be included or associated with the raw height data and the raw height map. Certain colors or spectra of colors may be designated by entering or setting them within the controller 41 as those that correspond to portions of the machine 10. The controller 41 may compare the colors associated with the raw height data to those designated colors within the controller. If the colors associated with the raw height data correspond to the designated colors, the confidence in the accuracy of the coordinates of the filtered data may be reduced. If desired, the process of assessing the accuracy of the filtered data based upon the color associated with the raw height data may be incorporated into stages 77-79.

If the accuracy of any of the filtered data is sufficiently suspect, the controller 41 may discard the filtered data from the current terrain map or database and rely upon older data for such data point. In other words, the data points defining the terrain map for the work surface 101 are initially generated and stored in a database. The mapping system may then be used to update the terrain map as the machine 10 moves about the work site 100. Data points that are obscured by any portion of the machine 10 are not updated during the mapping process until such data points are no longer obscured. If any portion of the machine 10 is positioned between a data point on the work surface 101 and the mapping sensors 31, the controller 41 is unlikely to change the data point until the machine has moved sufficiently such that the data point may be scanned. Once the filtered data has been generated and its accuracy assessed, the controller 41 may generate at stage 82 a terrain map based upon the updated or filtered data points. The terrain map may be used for any purpose including operating machine 10 remotely as well as providing data that may be used by other machines.

INDUSTRIAL APPLICABILITY

The industrial applicability of the system described herein will be readily appreciated from the forgoing discussion. The foregoing discussion is applicable to machines that are operated at a work site 100 and include a terrain mapping system 30. Although applicable to any type of machine, the system may be particularly applicable for use with machines that have movable work implements and other types of movable components that may be interposed between a work surface 101 to be mapped and a mapping sensor 31. The system may be used at any site in which mapping of the work site may be desirable.

The system may include a pose sensor 25 associated with machine 10 for generating pose signals indicative of a position and an orientation of the machine and a mapping sensor 31 on the machine for generating a plurality of raw data points defining a mapped surface. The system also has a database including a plurality of points defining the work surface and a controller. The controller 41 may be configured to receive pose signals from the pose sensor 25 and determine the position and the orientation of the machine 10 based upon the pose signals. The controller may further receive mapping signals from the mapping sensor 31, determine the plurality of raw data points based upon the mapping signals, and determine a plurality of machine points defining a position of a portion of the machine based upon the pose signals. The controller 41 may also filter the plurality of raw data points based upon the plurality of machine points to define a plurality of filtered data points and update the database based upon the plurality of filtered data points.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A system mounted on a machine for mapping a work surface, comprising:
   a pose sensor associated with the machine for generating pose signals indicative of a position and an orientation of the machine;
   a mapping sensor on the machine for generating a plurality of raw data points defining a mapped surface;
   a database including a plurality of points defining the work surface; and
   a controller configured to:

receive pose signals from the pose sensor;
determine the position and the orientation of the machine based upon the pose signals;
receive mapping signals from the mapping sensor;
determine the plurality of raw data points based upon the mapping signals;
determine a plurality of machine points defining a position of a portion of the machine based upon the pose signals;
filter the plurality of raw data points based upon the plurality of machine points to define a plurality of filtered data points; and
update the database based upon the plurality of filtered data points.

2. The system of claim 1, wherein the portion of the machine is a movable work implement and further including an implement position sensor for generating implement position signals indicative of a position of the movable work implement, and the controller being further configured to receive implement position signals, determine the position of the movable work implement based upon the implement position signals and the pose signals, and determine the plurality of machine points based upon the position of the movable work implement.

3. The system of claim 1, wherein the controller is further configured to compare the plurality of raw data points to the plurality of machine points and update the database based upon those of the plurality of raw data points that do not correspond any of the plurality of to machine points.

4. The system of claim 1, wherein the plurality of points defining the work surface are generated prior to the controller receiving the mapping signals from the mapping sensor.

5. The system of claim 1, wherein the plurality of raw data points includes raw height data.

6. The system of claim 5, wherein the raw height data defines a raw height map.

7. The system of claim 1, wherein the plurality of raw data points includes colors associated therewith and wherein the controller is further configured to compare the colors associated with plurality of the raw data points to the colors stored within the controller and update the database based upon those of the plurality of raw data points in which the colors do not correspond to the colors stored within the controller.

8. The system of claim 1, wherein the controller is further configured to filter raw data points corresponding to portions of the machine interposed between the work surface and the mapping sensor.

9. A controller-implemented method of mapping a work surface, comprising:
receiving pose signals from a pose sensor associated with a machine indicative of a position and an orientation of the machine;
determining the position and the orientation of the machine based upon the pose signals;
receiving mapping signals from a mapping sensor on the machine for generating a plurality of raw data points defining a mapped surface;
determining the plurality of raw data points based upon the mapping signals;
determining a plurality of machine points defining a position of a portion of the machine based upon the pose signals;
filtering the plurality of raw data points based upon the plurality of machine points to define a plurality of filtered data points; and
updating a database including a plurality of points defining the work surface based upon the plurality of filtered data points.

10. The method of claim 9, further including receiving implement position signals from an implement position sensor indicative of a position of the movable work implement, determining the position of the movable work implement based upon the implement position signals and the pose signals, and determining the plurality of machine points based upon the position of the movable work implement.

11. The method of claim 9, further including comparing the plurality of raw data points to the plurality of machine points and updating the database based upon the plurality of raw data points that do not correspond to machine points.

12. The method of claim 9, further including generating the plurality of points defining the work surface prior to receiving the mapping signals from the mapping sensor.

13. The method of claim 9, further including determining raw height data as part of the plurality of raw data points.

14. The method of claim 13, further including determining a raw height map.

15. The method of claim 9, further including comparing colors data associated with the plurality of raw data points to colors stored within a controller and updating the database based upon plurality of raw data points in which the colors do not correspond to the colors stored within the controller.

16. The method of claim 9, further including filtering raw data points corresponding to portions of the machine interposed between the work surface and the mapping sensor.

17. A machine comprising:
a frame;
a prime mover associated with the frame;
a pose sensor for generating pose signals indicative of a position and an orientation of the machine;
a mapping sensor for generating a plurality of raw data points defining a mapped surface;
a database including a plurality of points defining a work surface; and
a controller configured to:
receive pose signals from the pose sensor;
determine the position and the orientation of the machine based upon the pose signals;
receive mapping signals from the mapping sensor;
determine the plurality of raw data points based upon the mapping signals;
determine a plurality of machine points defining a position of a portion of the machine based upon the pose signals;
filter the plurality of raw data points based upon the plurality of machine points to define a plurality of filtered data points; and
update the database based upon the plurality of filtered data points.

18. The machine of claim 17, wherein the portion of the machine is a movable work implement and further including an implement position sensor for generating implement position signals indicative of a position of the movable work implement, and the controller being further configured to receive implement position signals, determine the position of the movable work implement based upon the implement position signals and the pose signals, and determine the plurality of machine points based upon the position of the movable work implement.

19. The machine of claim 17, wherein the controller is further configured to compare the plurality of raw data points to the machine points and update the database based upon those of the plurality of raw data points that do not correspond to machine points.

20. The machine of claim 17, wherein the controller is further configured to filter raw data points corresponding to portions of the machine interposed between the work surface and the mapping sensor.

\* \* \* \* \*